(12) United States Patent
Singh

(10) Patent No.: US 11,438,768 B2
(45) Date of Patent: Sep. 6, 2022

(54) DYNAMIC SPLIT OF COMMUNICATION LAYER PROCESSING

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 223 days.

(21) Appl. No.: 16/580,532

(22) Filed: Sep. 24, 2019

(65) Prior Publication Data

US 2021/0092614 A1 Mar. 25, 2021

(51) Int. Cl.

| | |
|---|---|
| *H04W 4/00* | (2018.01) |
| *H04W 16/08* | (2009.01) |
| *H04W 36/12* | (2009.01) |
| *H04W 16/04* | (2009.01) |
| *H04W 36/22* | (2009.01) |
| *H04W 36/16* | (2009.01) |

(52) U.S. Cl.
CPC ........... *H04W 16/08* (2013.01); *H04W 16/04* (2013.01); *H04W 36/125* (2018.08); *H04W 36/165* (2013.01); *H04W 36/22* (2013.01)

(58) Field of Classification Search
CPC ... H04W 16/04; H04W 16/08; H04W 36/125; H04W 36/165
See application file for complete search history.

(56) References Cited

U.S. PATENT DOCUMENTS

| | | | |
|---|---|---|---|
| 9,729,396 B2* | 8/2017 | Rosa de Sousa Teixeira | ............. H04W 84/042 |
| 2018/0167445 A1* | 6/2018 | Speight | ............... H04L 67/1012 |
| 2019/0223088 A1* | 7/2019 | Pateromichelakis | ....................... H04L 41/044 |
| 2019/0379455 A1* | 12/2019 | Wang | .................... H03M 3/458 |

* cited by examiner

*Primary Examiner* — Bo Hui A Zhu
(74) *Attorney, Agent, or Firm* — Armis IP Law, LLC

(57) ABSTRACT

A network environment includes a first station, a second station, and a communication manager. The communication manager monitors a backhaul between the first station and the second station. In one arrangement, the first station is a wireless access point providing wireless connectivity to multiple mobile communication devices. During operation, the backhaul conveys communications between the first station and the second station. Based on the monitoring, the communication manager produces a metric indicating an ability of the backhaul to convey communications. Based on the metric, the communication manager determines a split of multiple processing layers in a wireless protocol stack. To accommodate the split, the communication manager assigns a first portion of multiple network communication layers to the first station for processing and a second portion of the multiple network communication layers to the second station for processing.

39 Claims, 14 Drawing Sheets

DYNAMIC SPLIT OF COMMUNICATION LAYER PROCESSING

BACKGROUND

Conventional LTE (Long Term Evolution) cellular networks typically include a core network, a RAN (Radio Access Network), and one or more mobile communication devices (user equipment). The radio access network resides between user equipment such as a mobile phone, a computer, or any remotely controlled machine and provides connection with its core network (CN).

As its name suggests, the radio access network provides respective user equipment access (such as Internet access) via the core network.

Conveyances of wireless communications (data payloads) over a conventional LTE network require processing at many different network communication layers. For example, communication processing layers, or protocol stack, in a RAN architecture includes an RF (Radio Frequency) layer, a physical layer, a physical layer, a MAC (Multi-media Access Control) layer, a RLC (Radio Link Control) layer, a PDCP (Packet Data Converge Protocol) layer, an RRC (Radio Resource Control) layer, a data layer, etc.

A conventional wireless network can include multiple different types of resources to handle processing at the different communication layers. For example, first resources such as a so-called BaseBand Unit (BBU) can be configured to support processing of upper-layers of wireless network communications such as at the PDCP layer, RRC layer, etc. Second resources such as so-called Remote Radio Units can be configured to support processing of lower-layers of the wireless communications such as the RF layer, physical layer, MAC layer, etc.

3GPP allows splitting of eNB (eNodeB) functions (RRC, PDCP, RLC) between a BBU (BaseBand Unit) and RRU (Remote Radio Unit). Conventional products work based on a fixed functional split built into the corresponding hardware and software.

BRIEF DESCRIPTION OF EMBODIMENTS

Embodiments herein provide novel ways of dynamically selecting a split between upper and lower communication layer processing resources to support different wireless services in a network environment depending on current operating conditions.

For example, first embodiments include a first station, a second station, and communication management hardware such as associated with a radio controller. The communication management hardware is operative to monitor a backhaul between a first station and a second station. In one embodiment, the first station is a wireless access point providing wireless connectivity to multiple mobile communication devices. During operation, the backhaul conveys communications between the first station and the second station. Based on the monitoring, the communication management hardware evaluates an ability or performance of the backhaul to convey communications. Based on a metric generated during the evaluating, the communication management hardware splits layer processing between different resources. For example, in one embodiment, the communication management hardware assigns a first portion of multiple network communication layers to the first station (and corresponding processing resources) for processing and a second portion of the multiple network communication layers to the second station (and corresponding processing resources for processing.

In accordance with further embodiments, the metric produced by the communication management hardware is a first metric indicating the ability to convey first communications over the backhaul at a first instant in time. The communication management hardware produces a second metric indicating an ability of the backhaul to convey communications at a second instant in time. In one embodiment, in accordance with the second metric, the communication management hardware adjusts the split of processing the communication layers between the first station and the second station.

In yet further embodiments, the multiple network layers are layers in a wireless communication layer hierarchy (e.g., wireless protocol stack).

In still further embodiments, adjusting the split of processing the layers includes: i) assigning a less-than-all portion of the multiple communications layers for processing by the first station for a first duration of time based on the first metric indicating a quality of the backhaul link, and ii) re-assigning the less-than-all portion of the multiple communications layers for processing by the second station for a second duration of time based on the second metric indicating a changed quality in the backhaul link. In one embodiment, the second duration of time is contiguous with and occurs subsequent to the first duration of time.

Further embodiments herein include repeatedly or continuously monitoring a quality of the communications conveyed over the backhaul. In response to detecting a degradation in a quality of conveying the communications over the backhaul, the communication management hardware re-assigns processing of a particular network communication layer (which is one network processing layer in a hierarchy of communication layers) from the first station to the second station.

Yet further embodiments herein include repeatedly or continuously monitoring a quality of the communications conveyed over the backhaul. In response to detecting an increase in a quality or performance (such as decreased latency) of conveying the communications over the backhaul, the communication management hardware re-assigns processing of a particular network communication layer from the second station to the first station. Conversely, in response to detecting a decrease in a quality or performance (such as increased latency) of conveying the communications over the backhaul, the communication management hardware re-assigns processing of a particular network communication layer from the first station to the second station.

In accordance with additional embodiments, the multiple network communication layers include upper communication layers and lower communication layers in a wireless protocol stack used to convey communications between the first station and the second station.

In accordance with further embodiments, each of the first station and the second station are configurable, such as via sets of one or more virtual resources, to process different portions of the multiple network communication layers.

Note that the metrics generated by the communication management hardware can be based on any suitable one or more communication parameters. For example, in one embodiment, the metric is based at least in part on a latency measurement. A magnitude of the metric produced by the communication management hardware or other suitable resource indicates how long it takes to convey communications over the backhaul between the radio controller and the wireless base station.

Additionally, or alternatively, the metrics generated by the communication management hardware or other suitable resource is based on an amount of bandwidth in the backhaul that is available for allocation to communications between the radio controller and the wireless base station. In one embodiment, the magnitude of the metric depends on a combination of latency of transmitting the communications over the backhaul and an amount of bandwidth available for allocation in the backhaul.

Further embodiments herein include, via the communication management hardware, communicating a message to a network management resource. The message includes a request to allocate a first portion of multiple network communication layers to the first station for processing and a second portion of the multiple network communication layers to the second station for processing. In response to communicating the request, the communication management hardware receives a configuration response from the network management resource. In one embodiment, the configuration response configures the split of the multiple network communication layers assigned for processing by the first station and the second station.

Second embodiments herein include receiving, at a communication management resource, a request to establish a connectivity between a first station and a second station over a communication link. In a manner as previously discussed, a monitor resource monitors the communication link between the first station and the second station. The communication link conveys communications between the first station and second station. The communication management resource then dynamically adjusts a split of multiple processing layers allocated between the first station and the second based on an ability of the communication link to convey communications In accordance with an initial split of multiple processing layers in a wireless communication protocol stack, the communication management resource allocates communication layer processing resources to the first station and the second station in communication with each other over a communication link. Subsequent to the initial split, the communication management resource dynamically adjusts the split of multiple processing layers in the wireless communication protocol stack between the first station and the second station. To implement the adjusted split of the multiple processing layers amongst the first station and the second station, the communication management resource further adjusts the allocation of communication layer processing resources.

In accordance with further embodiments, both the first station and the second support execution of a first processing layer in a hierarchy of multiple processing layers (such as a wireless protocol stack). Via the communication management resource, dynamical adjustment of the split of processing layers includes: i) initially assigning, for a first duration of time, the first processing layer for execution at the first station, and ii) re-assigning, for a second duration of time, the first processing layer for execution by the second station.

In yet further embodiments, the first station is a wireless station providing wireless connectivity to multiple mobile communication devices; a combination of first processing hardware associated with the first station and second processing hardware associated with the second station execute the multiple processing layers; execution of the multiple processing layers supports wireless connectivity associated with the mobile communication devices.

In still further embodiments, dynamically adjusting the split of processing layers allocated between the first station and the second includes: via the communication management resource, initially allocating a particular communication processing layer of the multiple processing layers to the first station. In response to a change in the quality of the communication link, the communication management resource re-assigns processing of the particular communication processing layer from the first station to the second station.

As previously discussed, in one embodiment, the ability to communicate over the communication link depends on a combination of latency of conveying communications over the communication link and an amount of bandwidth in the communication link available for allocation.

In accordance with yet more specific embodiments, the communication management resource as described herein negotiates the level of the functional split based on the backhaul type used to connect them. For example, in one embodiment, based on the quality of the backhaul link, the RRU (such as first station) and BBU (second station) negotiate the split type to be implemented. In one embodiment, the virtual software communication layer processing functions such as RRC, RLC, PDCP layers can be executed by different stations in accordance with a dynamically selected split between of processing layers between the BBU and the RRU.

As previously discussed, further embodiments herein include continually monitoring latency and throughput of the backhaul link and adjusting the split of communication processing layers accordingly to optimize the services to for better user experience.

Embodiments herein facilitate deployment of split processing communication systems without the need for determining a fixed split to be implemented by the communication system. This helps to provide better user experience via more efficient use of network resources. More specifically, dynamic splitting of communication processing layers amongst multiple stations is useful over conventional techniques to accommodate different network conditions. For example, as further discussed herein, in certain situations, it is desirable to assign processing of more communication layers in a hierarchy to a first station than a second station; in other situations, it is desirable to assign processing of more communication layers in a hierarchy to a second station than the first station.

These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate split processing of communications in a network environment. The instructions, when executed by computer processor hardware, cause the computer processor hardware (such as one or more co-located or disparately processor devices) to: monitor a backhaul between a first station and a second station, the backhaul conveying communications between the first station and the second station; produce a metric indicating an ability of the backhaul to convey communications; and based on the metric, assign a first portion of multiple network communication layers to the first station for processing and a second portion of the multiple network communication layers to the second station for processing.

Another embodiment includes a computer readable storage medium and/or system having instructions stored thereon to facilitate conveyance of communications in a network environment. The instructions, when executed by computer processor hardware, cause the computer processor hardware (such as one or more co-located or disparately processor devices) to: receive a request to establish a connectivity between a first station and a second station over a communication link; monitor the communication link between the first station and the second station, the communication link conveying communications between the first station and second station; and dynamically adjust a split of multiple processing layers allocated between the first station and the second station.

Another embodiment includes a computer readable storage medium and/or system having instructions stored thereon to facilitate split processing of communications in a network environment. The instructions, when executed by computer processor hardware, cause the computer processor hardware (such as one or more co-located or disparately processor devices) to: in accordance with a split of multiple processing layers in a wireless communication protocol stack, allocate communication layer processing resources to a first station and a second station in communication with each other over a communication link; dynamically adjust the split of multiple processing layers in the wireless communication protocol stack between the first station and the second station; and adjust the allocation of communication layer processing resources to accommodate the adjusted split of the multiple processing layers.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless connectivity. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
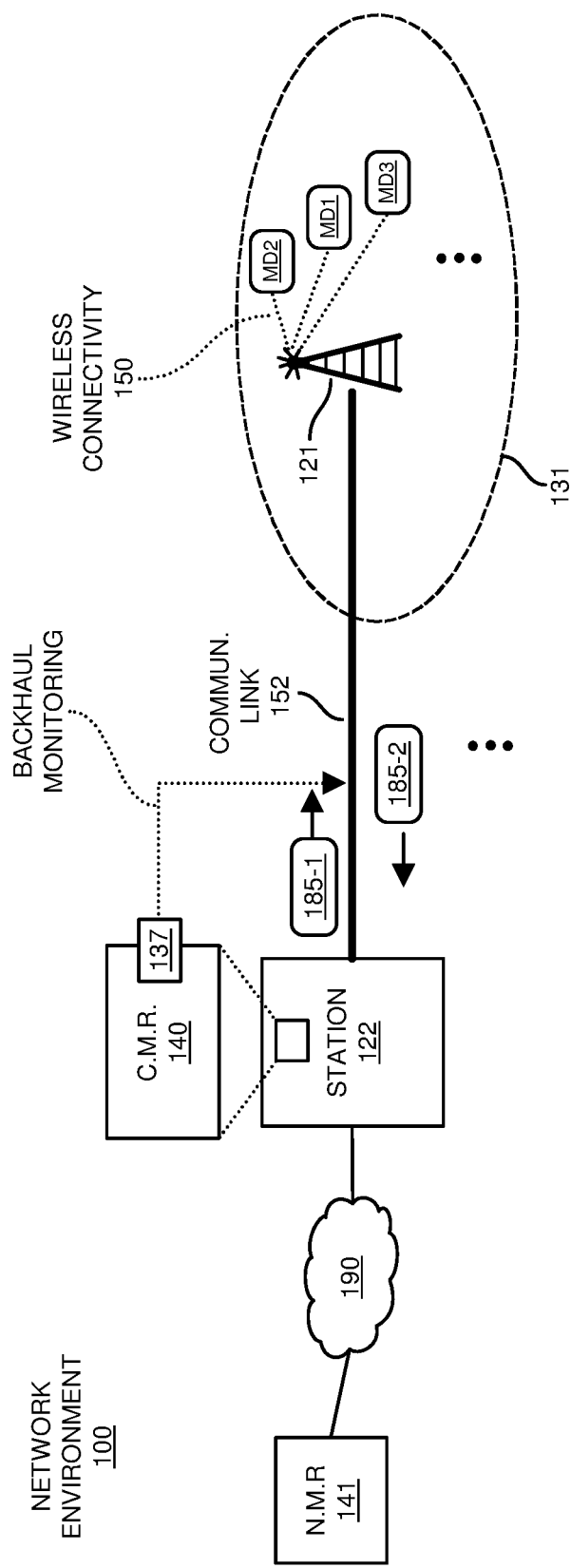
FIG. 1 is an example diagram illustrating a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a network includes a first station, a second station, and a communication manager. The communication manager monitors a backhaul that conveys communications between the first station and the second station. In one embodiment, the first station is a wireless base station providing wireless connectivity to multiple mobile communication devices. Based on the monitoring, the communication manager evaluates an ability of the backhaul to convey communications. In accordance with metric generated based on the evaluating, the communication manager determines a split associated with a wireless protocol stack and assigns a first portion of multiple network communication layers in the protocol stack to the first station for processing and a second portion of the multiple network communication layers of the protocol stack to the second station for processing.

Further embodiments herein include dynamically adjusting the split of different communication processing layers to disparately located processing resources in the network environment depending on a trigger event such as changes in the ability of the backhaul to convey communications, detected need to re-allocate processing resources, etc.

Now, more specifically, FIG. 1 is an example diagram illustrating a wireless network environment according to embodiments herein.

In this example embodiment, network environment 100 includes network management resource 141, network 190, station 121, and station 122. Station 122 (such as a radio controller) includes communication management resource 140 and corresponding monitor resource 137. Via wireless connectivity 150, the station 121 provides wireless connectivity to the mobile devices MD1, MD2, MD3, etc., over communication link 152 (and through the station 122 to remote network 190 (such as the Internet).

In one embodiment, network environment 100 and corresponding wireless station 121 supports LTE communications (such as based on 3G, 4G, 5G, etc.) with the mobile devices, although the wireless station 121 can be configured to support wireless connectivity via any suitable wireless protocol.

Note further that each of the resources in network environment 100 can be implemented via hardware, software, or a combination of both hardware and software.

For example, network management resource 141 can be implemented as network management hardware, network management software, or a combination of network management hardware and network management software; monitor resource 137 can be implemented as monitor resource hardware, monitor resource software, or a combination of monitor resource hardware and monitor resource software; communication management resource 145 can be implemented as communication management hardware, communication management software, or a combination of communication management hardware and communication management software; communication management associated with station 122 can be implemented as hardware, software, or a combination of hardware and software; communication management functionality associated with station 121 can be implemented as hardware, software, or a combination of hardware and software; so on.

In one embodiment, the communication link 152 is a so-called backhaul (such as a physical or wireless connection) providing connectivity between the wireless station 121 and the station 122. Communication link 152 can be configured to support communications between the station 122 and any number of wireless stations.

As further shown, during operation, monitor resource 137 such as associated with communication management resource 140 monitors one or more parameters associated with the communication system illustrated in network environment 100. For example, in one embodiment, the monitor resource 137 monitors a performance associated with the communication link 152.

As previously discussed, embodiments herein provide novel ways of dynamically allocating a split between upper and lower communication layers in a wireless communication protocol stack. For example, in accordance with an initial selected split option, first allocated resources in the network environment 100 support processing of the upper communication layers associated with data packets; second allocated resources in the network environment 100 support processing of the upper communication layers associated with data packets.

As further discussed herein, the split between the upper communication layers and lower communication layers in the wireless protocol stack varies over time.

As a more specific example of operation, the monitor resource 137 monitors the communication link 152 between the first station 121 and the second station 121. The communication link 152 conveys communications 185 (such as communications 185-1 and communication 185-2) between the first station 121 and the second station 122. In one embodiment, based on the monitoring, the communication management resource 145 produces a metric indicating an ability of the backhaul to convey communications between the station 121 and the station 122. The communication management resource 140 uses the metric to select a split of the wireless protocol stack. Based on the selected split (and metric), the communication management resource 140 (such as a controller) assigns a first portion of multiple network communication layers in the protocol stack to the first station 121 and corresponding resources for processing and a second portion of the multiple network communication layers in the protocol stack to the second station 122 for processing.

In yet further example embodiments, in accordance with an initial split of multiple processing layers in a wireless communication protocol stack, the communication management resource 140 allocates communication layer processing resources to the first station 121 and the second station 122 to processing different layers of communications 185.

The communication management resource 140 dynamically adjusts the split of the multiple processing layers in the wireless communication protocol stack between the first station 121 and the second station 122. Based on the adjusted split, the communication management resource 140 adjusts the allocation of communication layer processing resources to accommodate the adjusted split of the multiple processing layers in the wireless protocol stack.

Figure 2:
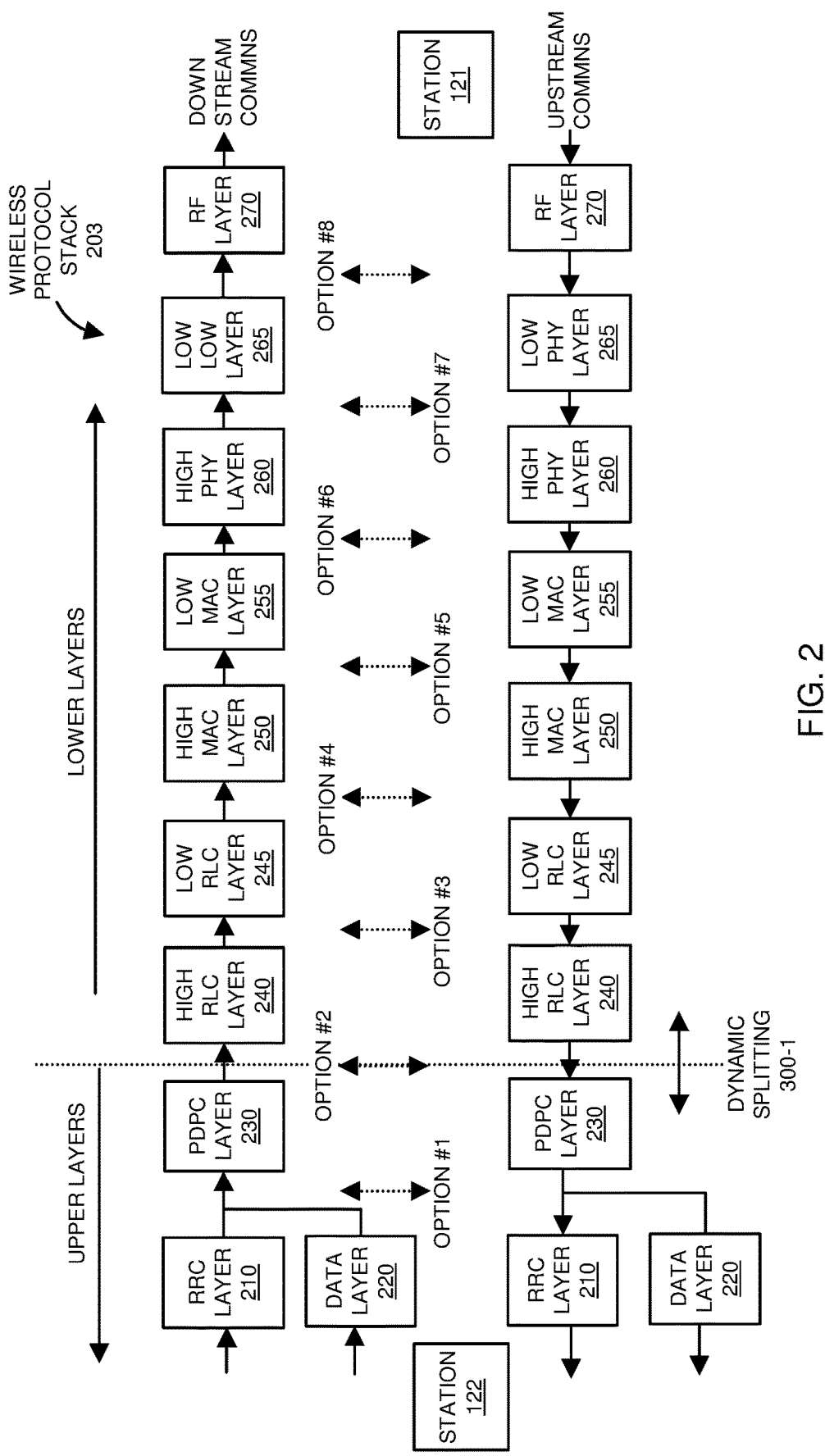
FIG. 2 is an example diagram illustrating dynamic split communication processing at multiple network communication layers according to embodiments herein.

FIG. 2 is an example diagram illustrating dynamic split communication processing of multiple network communication layers in a protocol stack according to embodiments herein.

In one embodiment, as shown, the hierarchy (protocol stack 203 such as a wireless LTE protocol stack) of wireless communication layers includes upper-layers and lower-layers such as RRC layer 210, PDPC (Packet Data Convergence Protocol) layer 230, high RLC (Radio Link Control) layer 240, low RLC layer 245, high MAC (Media Access Control) layer 250, low MAC layer 255, high PHY (Physical) layer 260, low PHY layer 265, and RF (Radio Frequency) layer 270.

In accordance with embodiments herein, the split between upper and lower-layers in the protocol stack 203 is dynamically adjusted via the communication management resource 140.

For example, the communication management resource 140 can be configured to: select a split of the protocol stack 203 between the RRC layer 210 and the PDPC layer 230 as indicated by option #1; select a split of the protocol stack 203 between the PDPC layer 230 and the high RLC layer 240 as indicated by option #2; select a split of the protocol stack 203 between the high RLC layer 240 and the low RLC layer 245 as indicated by option #3; select a split of the protocol stack 203 between the low RLC layer 245 and the high MAC layer 250 as indicated by option #4; select a split of the protocol stack 203 between the high MAC layer 250 and the low MAC layer 255 as indicated by option #5; select a split of the protocol stack 203 between the low MAC layer 255 and the high PHY layer 260 as indicated by option #6; select a split of the protocol stack 203 between the high PHY layer 260 and the low PHY layer 265 as indicated by option #7; select a split of the protocol stack 203 between the low PHY layer 265 and the RF layer 270 as indicated by option #8; and so on.

In one embodiment, as further discussed herein, a combination of first processing resources (such as hardware and/or software) associated with the first station 121 and second processing resources (such as hardware and/or software) associated with the second station 122 execute the multiple processing layers in the wireless protocol stack 203. Execution of the multiple processing layers in the wireless protocol stack 203 supports wireless communications (data packets of which are conveyed as communications 185 over the communication link 152) associated with the mobile communication devices MD1, MD2, MD3, etc.

As further discussed herein, the communication management resource 140 dynamically adjusts the split of processing layers allocated between the first station 121 and the second station 122. This can includes initially allocating a particular communication processing layer of the multiple processing layers to the first station 121. In response to a change in the quality of (such as ability to communicate over) the communication link 152, the communication management resource 140 re-assigns processing of the particular communication processing layer from the first station 121 to the second station 122.

Conversely, embodiments herein include initially allocating a particular communication processing layer of the multiple processing layers to the second station 122. In response to a change in the quality of (such as ability to communicate over) the communication link 152, the communication management resource 140 re-assigns processing of the particular communication processing layer from the second station 122 to the first station 121.

Figure 3:
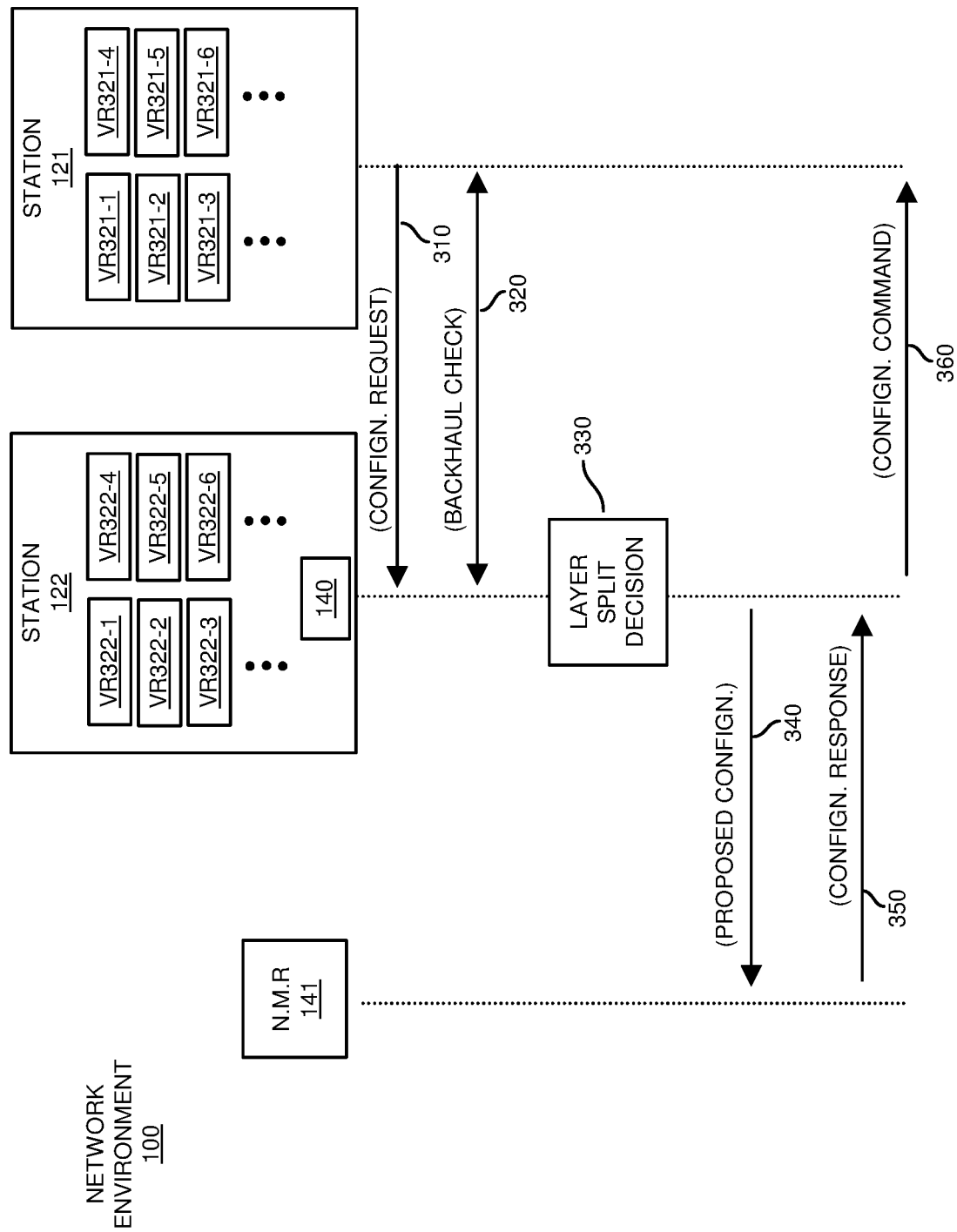
FIG. 3 is an example diagram illustrating dynamic split of processing communication layers of a wireless protocol stack according to embodiments herein.

FIG. 3 is an example diagram illustrating dynamic splitting of a wireless protocol stack according to embodiments herein.

As shown in this example embodiment, each of the first station 121 and the second station 122 include configurable resources (such as virtual resources) to process different portions of the multiple network communication layers in the wireless protocol stack 203.

For example, in one embodiment, the station 122 includes virtual resources VR322-1, VR322-2, VR322-3, VR322-4, VR322-5, VR322-6, etc. The station 121 includes virtual resources VR321-1, VR321-2, VR321-3, VR321-4, VR321-5, VR321-6, etc.

As their name suggests, the virtual resources associated with station 121 and 122 are configurable for processing different communication layers in the wireless protocol stack 203. Thus, in one embodiment, the virtual resources are configurable and re-assignable as needed or desired.

In yet further embodiments, each of the virtual resources represents one or more resources such as computers, software, processing threads, quanta of processing time, etc., in which to process different layers of received communications.

As previously discussed, assume that the station 121 is instantiated or activated to provide wireless connectivity to one or more mobile devices in the region of wireless coverage 131. In such an instance, the station 121 communicates a configuration request via communications 310 to the communication management resource 140 residing at station 122.

In response to receiving the request, the communication management resource 140 initiates testing or monitoring of the communication link 152 between the station 122 and 121. In one embodiment, a measured performance of the communication link 152 is used as a basis in which to select an appropriate split of the wireless protocol stack 203.

More specifically, in one embodiment, via monitor resource 137, the communication management resource 140 monitors a latency of communicating data packets over the communication link 152 between the station 122 and the station 121. This can include measuring a time difference between: i) the station 122 transmitting a test data packet from the station 122 over the communication link 152 to the station 121, and ii) the station 120 to receiving a corresponding return data packet transmitted from the station 121 over the communication link 152. The corresponding round-trip time provides an indication of the performance capability of the communication link 152 to support communications between the station 122 and station 121.

Other parameters that can be used to determine the capability of communicating data packets over the communication link 152 include measuring or determining unavailable bandwidth in the communication link 152 that is available to support communications between the station 121 station 122.

Embodiments herein include utilizing a magnitude of a latency metric associated with conveying communications over the communication link 152 between the station 122 and the wireless base station 121 as a basis to determine a respective split of the wireless protocol stack 203.

Additionally, or alternatively, embodiments herein include utilizing a magnitude of a bandwidth availability metric associated with conveying communications over the communication link 152 between the station 122 and the wireless base station 121 as a basis to determine a respective split of the wireless protocol stack 203.

Via processing operation 330, the communication management resource 140 determines a split of the wireless protocol stack 203 based on one or more metrics such as the latency metric, bandwidth availability metric, trigger events in the network environment 100, etc.

Via communications 340, the communication management resource 140 communicates a request to the network management resource 141. In one embodiment, the request includes a proposed configuration of allocating a first portion of multiple network communication layers to the first station 121 for processing and a second portion of the multiple network communication layers to the second station 122 for processing. Alternatively, note that the station 122 can be configured to communicate a request to the network management resource 141 regarding how resources (such as virtual resource 322 and 323 should be allocated to provide an appropriate split of the wireless protocol stack 203.

Via communications 350 received from the network management resource 141, as a response to communicating the request, the communication management resource 140 receives a (configuration) response transmitted from the network manager 141. In one embodiment, the communications 350 include configuration information response information (such as configuration information) indicating how to configure a split processing of the multiple network communication layers in the wireless protocol stack 203 between the first station 121 and the second station 122.

Via communications 360 from the station 122 to the station 121, the station 121 receives configuration information (potentially including a configuration command) indicating what processing layers to be managed by the wireless station 121 and corresponding resources to process the assigned layers of the wireless protocol stack 203.

As further discussed herein, the communication management resource 140 generates different metrics or detects different trigger events (such as prompting a change in a selected processing layer split) at different times based on continuous or occasional monitoring of the communication link 152.

For example, in one embodiment, the communication management resource 140 generates a first metric indicating the ability to convey first communications over the communication link 152 at a first instant in time. As previously discussed, the first metric is used to determine an initial split of the wireless protocol stack 203.

Further embodiments herein include, at a later instant in time of monitoring the communication link 152, producing a second metric indicating an ability of the communication link 152 to convey communications. Based on the second (updated) metric, the communication management resource 140 adjusts the split of processing the communication layers between the first station and the second station.

Figure 4:
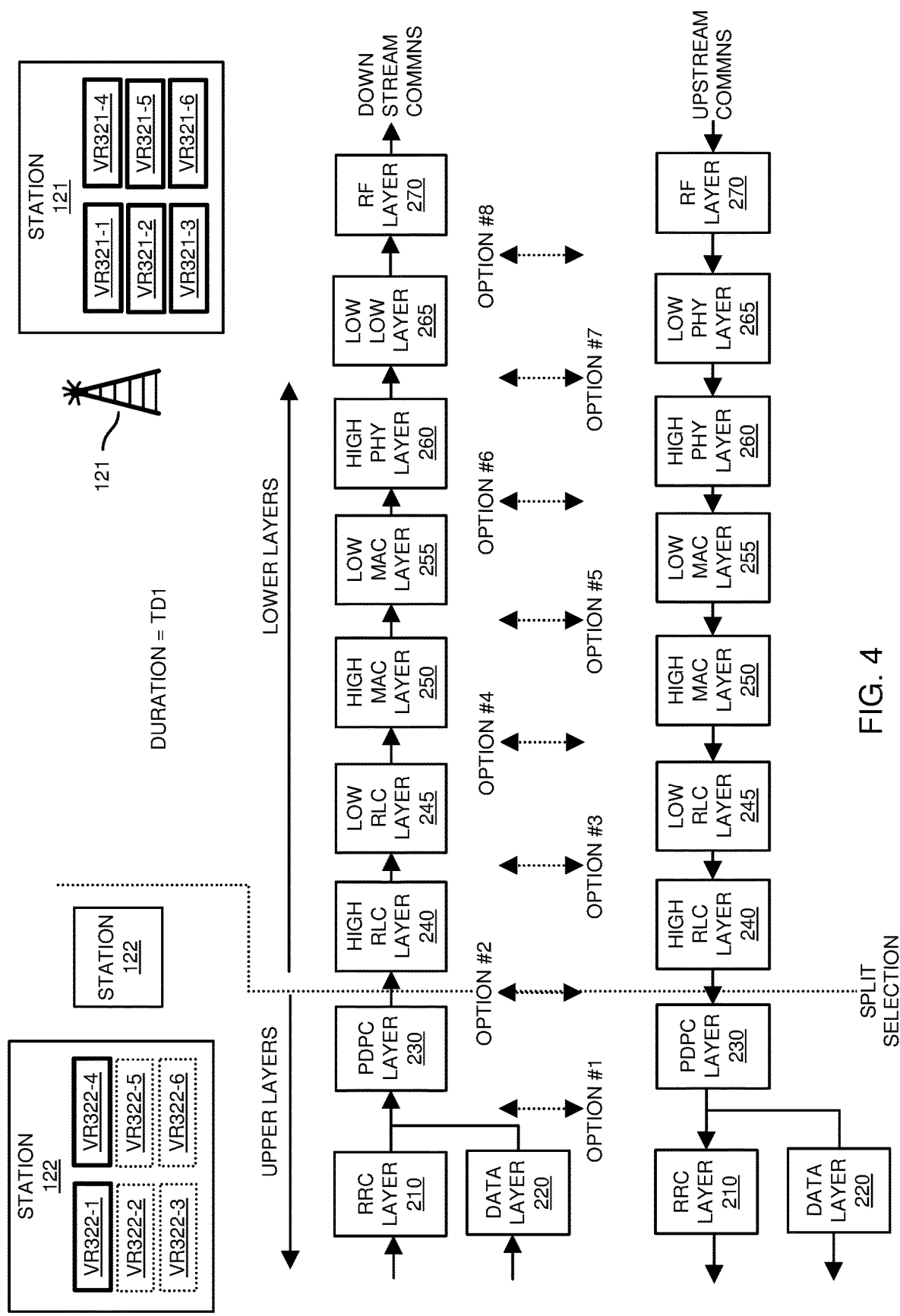
FIG. 4 is an example diagram illustrating a first selection of a split of communication processing layers amongst multiple disparately located communication layer processing resources according to embodiments herein.

FIG. 4 is an example diagram illustrating a first selection of a split of communication processing layers amongst multiple disparately located resources according to embodiments herein.

Assume, in this example embodiment, that the processing operation 330 detects that the communication link 152 supports very high latency (such as above a first threshold value) associated with communications 185 (or other test communications) between the station 121 and the station 122 for time duration TD1. In one embodiment, the first threshold value is set to 100 milliseconds, although the first threshold value can be set to any suitable value.

In such an instance, for a first time duration TD1, the communication management resource 140 detects that the latency is quite high between the first wireless station and the second wireless station. In such an instance, the communication management resource 140 selects a split (such as option #2) of the processing layers in the wireless protocol stack 203 such that: i) the station 122 and/or corresponding appropriate amount of configurable resources (such as virtual resources VR322-1 and VR322-4) process the upper layers such as layers 210, 220, and 230 associated with the wireless protocol stack 203, and ii) the station 121 and/or corresponding appropriate amount of configurable resources (such as virtual resources VR321-1, VR321-2, VR321-3, VR321-4, VR321-5, and VR322-6) process the lower layers such as layers 240, 245, 250, 255, 260, 265, and 270 associated with the wireless protocol stack 203. Virtual resources VR322-2, VR322-3, VR322-5, and VR322-6 associated with station 122 are not assigned to the processing of communications 185.

Figure 5:
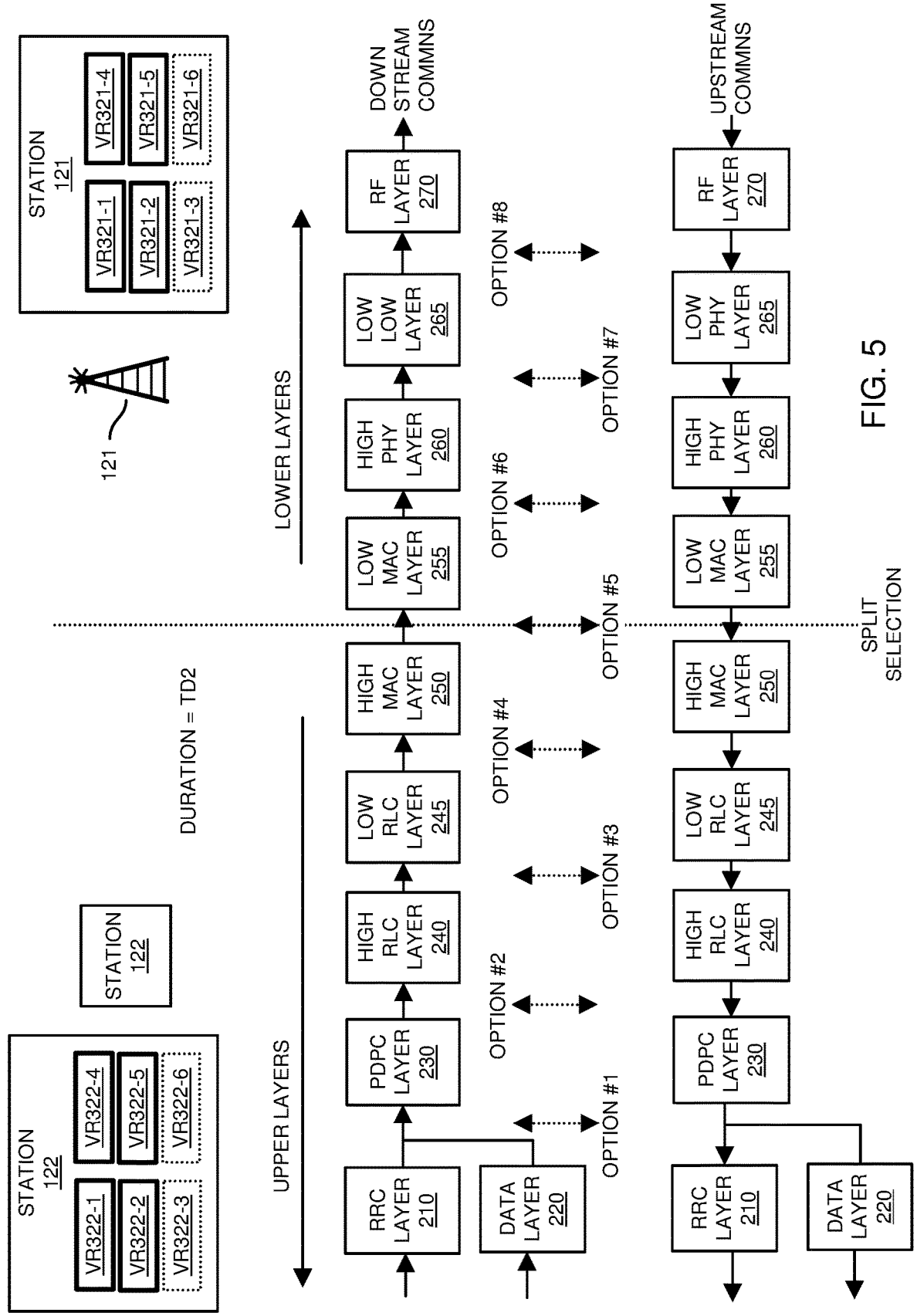
FIG. 5 is an example diagram illustrating a second selection of a split of a wireless protocol stack according to embodiments herein.

FIG. 5 is an example diagram illustrating a second selection of a split of communication processing layers amongst multiple disparately located resources according to embodiments herein.

Assume in this example embodiment, that the processing operation 330 detects that the communication link 152 supports moderate latency (such as in a time range) of communications between the station 121 and the station 122 at the beginning of time duration TD2. In one embodiment, the detected latency falls in a time range between 40 and 60 milliseconds, although the range can be defined by any suitable values.

In such an instance, for the second time duration TD2 (such as contiguous and subsequent to time duration TD1), the communication management resource 140 selects a split (such as option #5) of the processing layers in the wireless protocol stack 203 such that: i) the station 122 and/or corresponding appropriate amount of configurable resources (such as virtual resources VR322-1, VR322-2, VR322-4, and VR322-5) process the upper layers such as layers 210, 220, 230, 240, 245, and 250 associated with the wireless protocol stack 203, and ii) the station 121 and/or corresponding appropriate amount of configurable resources (such as virtual resources VR321-1, VR321-2, VR321-4, and VR321-5) process the lower layers such as layers 255, 260, 265, and 270 associated with the wireless protocol stack 203.

Accordingly, the adjustment of the split from option #2 to option #5 results in freeing up of virtual resources VR321-3 and VR321-6 associated with wireless station 121, while virtual resources VR322-2 and VR322-5 are now used by the station 122 for processing communications 185.

Figure 6:
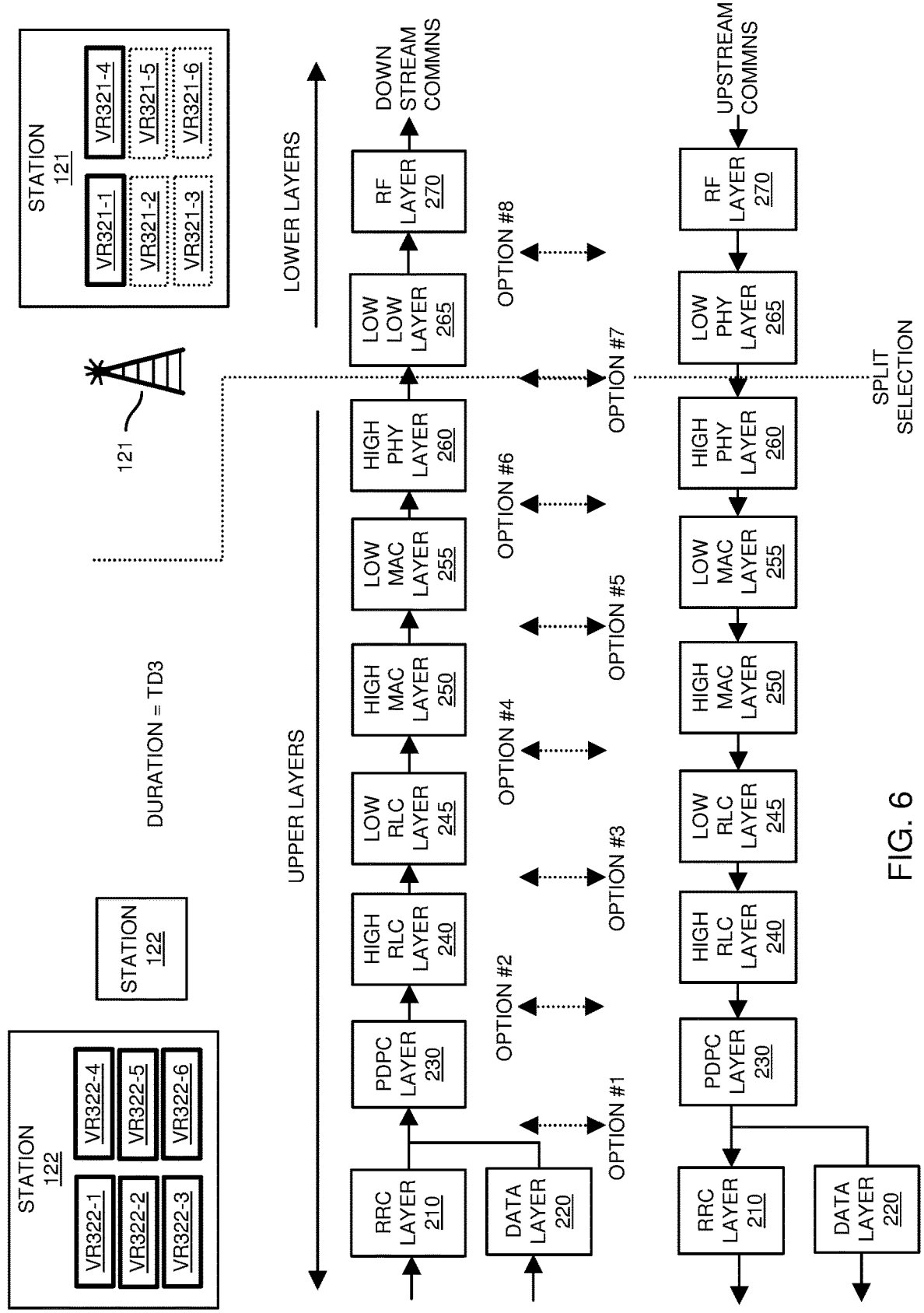
FIG. 6 is an example diagram illustrating a third selection of a split of a wireless protocol stack according to embodiments herein.

FIG. 6 is an example diagram illustrating a third selection of a split of communication processing layers amongst multiple disparately located resources according to embodiments herein.

Assume in this example embodiment, that the processing operation 330 detects that the communication link 152 supports low latency transmission (such as less than a second threshold value) of communications between the station 121 and the station 122 at the beginning of time duration TD3. In one embodiment, the detected latency is less than a second threshold value such as 250 nanoseconds, although the second threshold value can be set to any suitable value.

In such an instance, for the third time duration TD3 (such as contiguous and subsequent to time duration TD2), the communication management resource 140 selects a split (such as option #7) of the processing layers in the wireless protocol stack 203 such that: i) the station 122 and/or corresponding appropriate amount of configurable resources (such as virtual resources VR322-1, VR322-2, VR322-3, VR322-4, VR322-5, and VR322-6) process the upper layers of communications 185 such as layers 210, 220, 230, 240, 245, 250, 255, and 260, associated with the wireless protocol stack 203, and ii) the station 121 and/or corresponding appropriate amount of configurable resources (such as virtual resources VR321-1 and VR321-4) process the lower layers of communications 185 such as layers 265 and 270 associated with the wireless protocol stack 203.

Accordingly, the adjustment of the split from option #5 to option #7 in FIG. 6 results in freeing up of virtual resources VR321-2, VR321-3, VR321-5, and VR321-6, while virtual resources VR322-3 and VR322-6 are now used by the station 122.

This illustrates how a detected increase in a quality of conveying the communications over the communication link 152 (such as via lower latency) results in the communication management resource 140 re-assigning processing of a particular network communication layer (such as layer 255, layer 260) from the first station 121 to the second station 122 as well as reallocating of corresponding available virtual resources 321 and 322.

Figure 7:
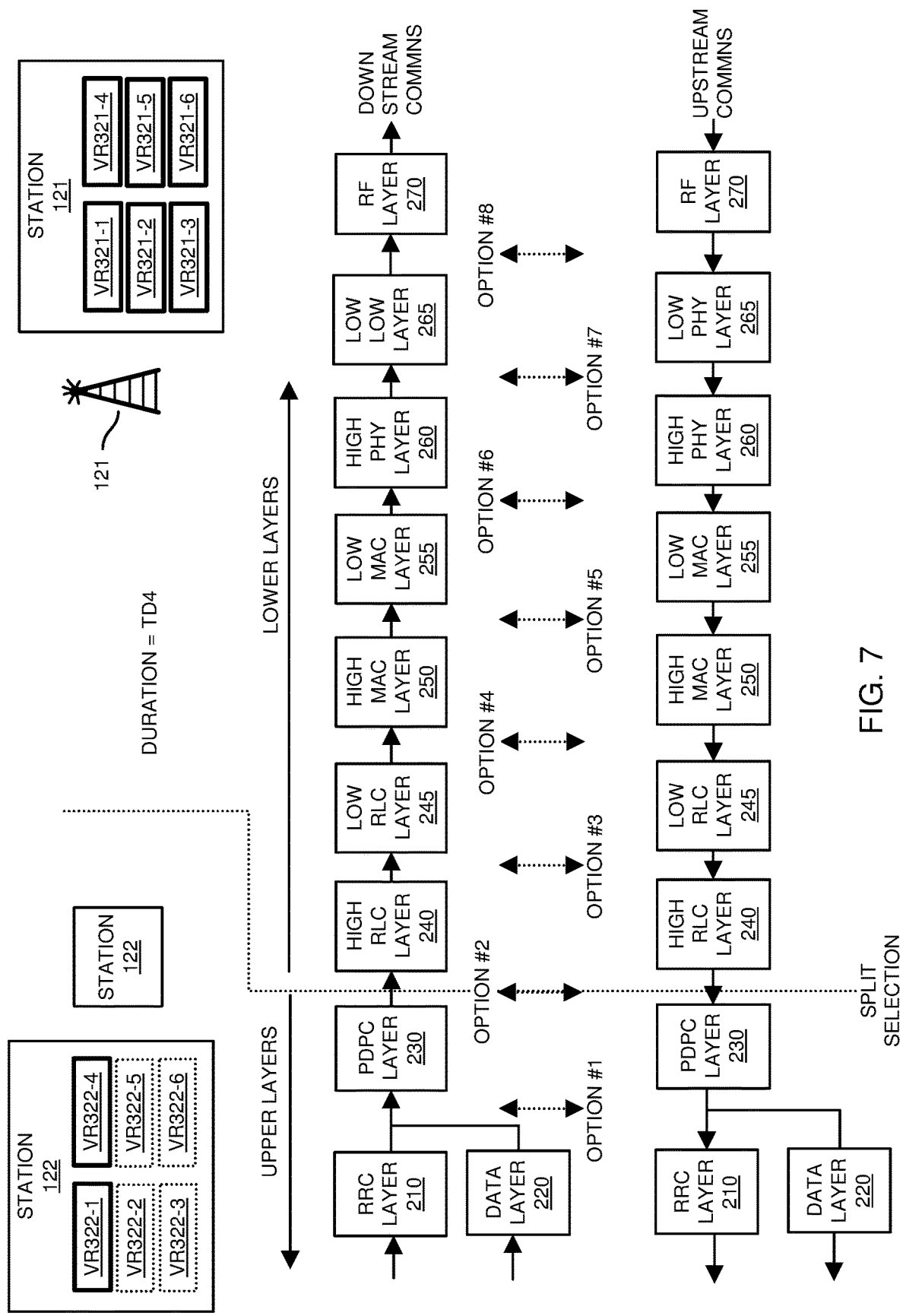
FIG. 7 is an example diagram illustrating a fourth selection of a split of a wireless protocol stack according to embodiments herein.

FIG. 7 is an example diagram illustrating a fourth selection of a split of communication processing layers amongst multiple disparately located resources according to embodiments herein.

Assume, in this example embodiment, that the processing operation 330 detects that the communication link 152 supports very high latency (such as above a first threshold value) conveyance of communications 185 again between the station 121 and the station 122 for time duration TD4. In one embodiment, as previously discussed, the first threshold value is 100 milliseconds, although the first threshold value can be set to any suitable value.

In such an instance, for a first time duration TD4 (such as contiguous and subsequent to time duration TD3), the communication management resource 140 selects an updated split (such as option #2) of the processing layers in the wireless protocol stack 203 such that: i) the station 122 and/or corresponding appropriate amount of configurable resources (such as virtual resources VR322-1 and VR322-4) process the upper layers such as layers 210, 220, and 230 associated with the wireless protocol stack 203, and ii) the station 121 and/or corresponding appropriate amount of configurable resources (such as virtual resources VR321-1, VR321-2, VR321-3, VR321-4, VR321-5, and VR322-6) process the lower layers such as layers 240, 245, 250, 255, 260, 265, and 270 associated with the wireless protocol stack 203.

Figure 8:
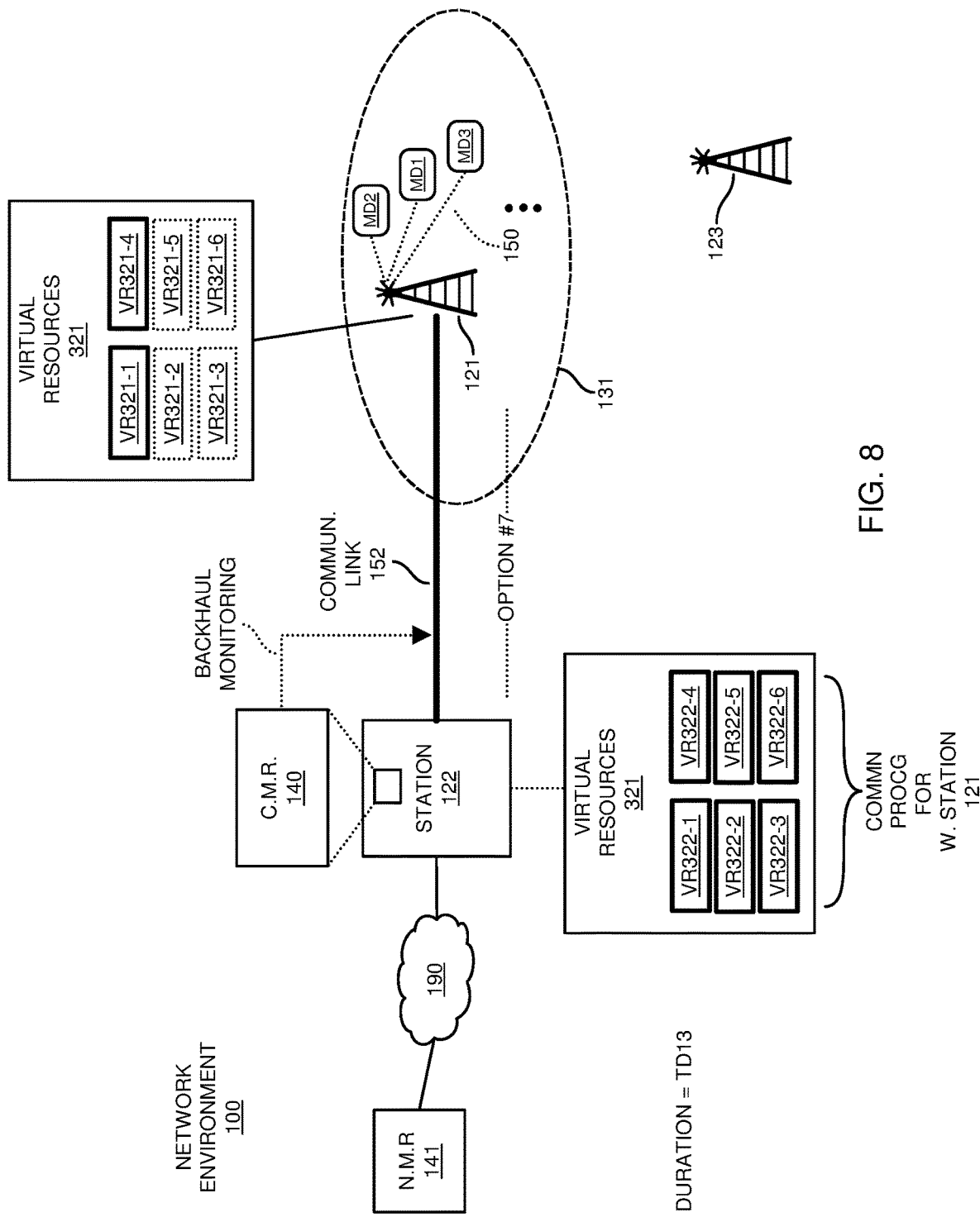
FIG. 8 is an example diagram illustrating a first allocation of resources at disparate locations to provide split layer communication processing according to embodiments herein.

FIG. 8 is an example diagram illustrating a first allocation of resources at disparate locations to provide split layer communication processing according to embodiments herein.

As previously discussed, similar to the discussion in FIG. 6, assume that the communication management resource 140 selects a split (such as split option #7) of the processing layers in the wireless protocol stack 203 such that: i) the station 122 and/or corresponding appropriate amount of configurable resources (such as virtual resources VR322-1, VR322-2, VR322-3, VR322-4, VR322-5, and VR322-6) process the upper layers such as layers 210, 220, 230, 240, 245, 250, 255, and 260 associated with the wireless protocol stack 203, and ii) the station 121 and/or corresponding appropriate amount of configurable resources (such as virtual resources VR321-1 and VR321-4) process the lower layers such as layers 265 and 270 associated with the wireless protocol stack 203.

As further shown, the wireless station 123 is deactivated. Therefore, no virtual resources 321 associated with the station 122 are assigned to the wireless station 123.

Figure 9:
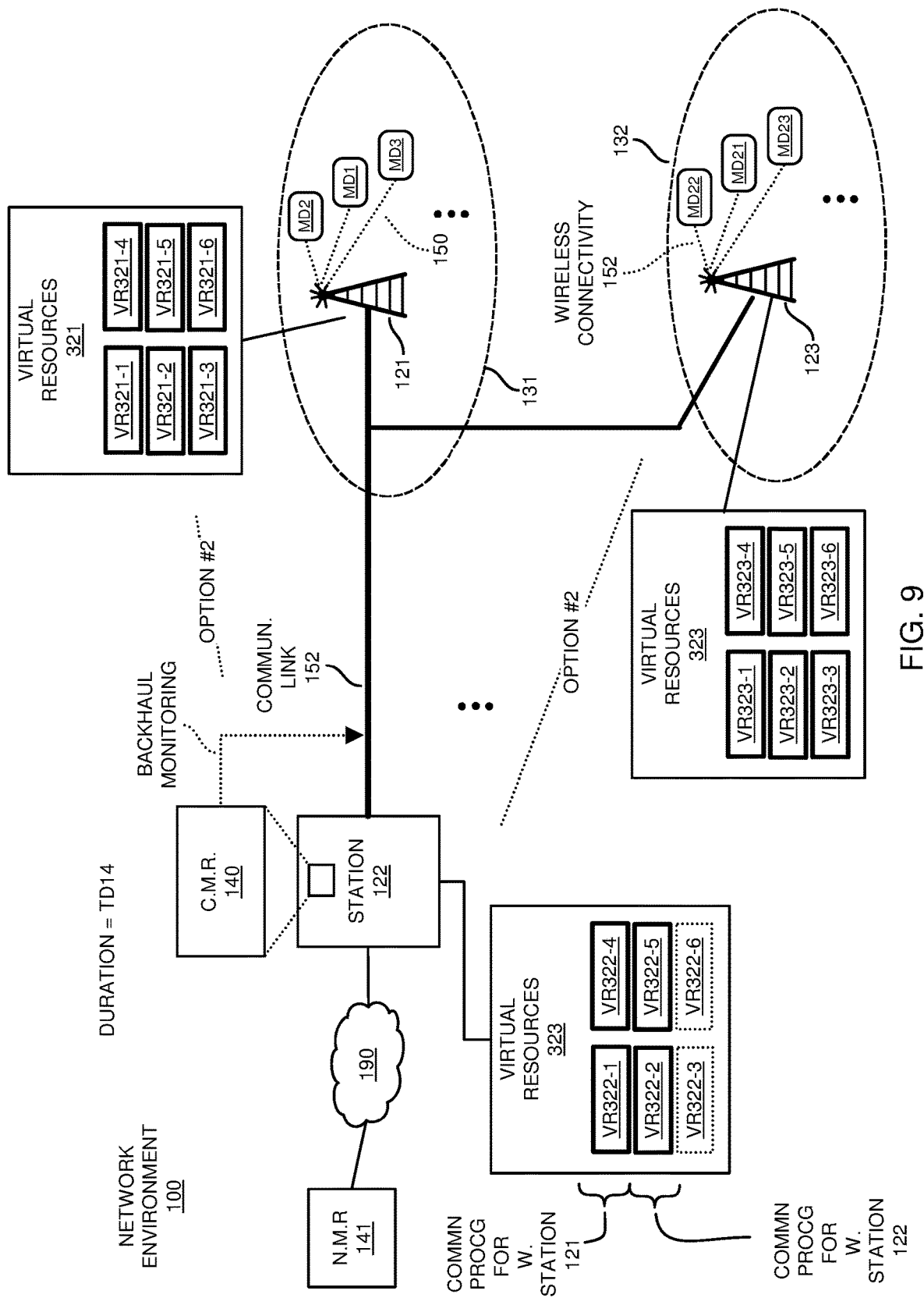
FIG. 9 is an example diagram illustrating a second allocation of resources at disparate locations to provide split layer communication processing according to embodiments herein.

Assume that the communication management resource 140 receives a command or decides to activate the wireless station 123 in network environment 100 such that it is able to provide wireless connectivity to multiple mobile communication devices (such as mobile device MD22, MD23, MD24, etc.) as shown in FIG. 9. In such an instance, the (shared) communication link 152 conveys communications associated with the mobile devices between the wireless station 123 and the remote network 190.

FIG. 9 is an example diagram illustrating a second allocation of resources at disparate locations to provide split layer communication processing according to embodiments herein.

In this example embodiment, the communication management resource 140 associated with station 122 needs to provide split layer processing to both the wireless station 121 and wireless station 123. The wireless station 123 can be configured to communicate communications over communication link 152 (which is shared by the wireless stations 121 and 123 or the wireless station 123 can be configured to communicate with the station 122 via a different backhaul than the backhaul (communication link 152) between the station 122 and wireless station 121.

Because both wireless station 121 and wireless station 123 are activated for duration TD14, this means that virtual resources associated with the station 122 must be freed so they can be used to support upper layer processing associated with communications conveyed over the communication link 152 between station 122 and wireless station 123.

In this example embodiment, the shared use of the virtual resources 323 causes the communication management resource 140 to select a new split of the wireless protocol stack 203 to support processing of communications associated with the station 121. The communication management resource 140 also selects a split option #2 to process communications 186 (such as communications 186-1 and 186-2) associated with wireless station 122.

For example, in response to activation (or intended future activation) of the wireless station 123, the communication management resource changes the split from option #7 (in FIG. 8) to option #2 (in FIG. 9). This makes it possible to allocate a portion of virtual resources 323 to process communications (185 and 186) associated with both the wireless station 121 and the wireless station 123.

More specifically, to support processing of communications associated with wireless station 121, the communication management resource 140 allocates virtual resources VR322-1 and VR322-4 at the station 122 to process layers 210, 220, and 230 associated with upstream/downstream communications 185 between the station 122 and the wireless station 121. The wireless station 121 is assigned virtual resources 321 (VR321-1, VR321-2, VR321-3, VR321-4, VR321-5, and VR321-6) to process layers 240, 245, 250, 255, 260, 265, and 270 in the protocol stack 203.

Additionally, to support processing of communications associated with wireless station 123, the communication management resource 140 allocates virtual resources VR322-2 and VR322-5 at the station 122 to process layers 210, 220, and 230 associated with communications 186 between the station 122 and the wireless station 123. The wireless station 123 includes assignment of virtual resources 323 (VR323-1, VR323-2, VR323-3, VR323-4, VR323-5, and VR323-6) to process layers 240, 245, 250, 255, 260, 265, and 270 in the protocol stack 203 for communications 186 between the station 122 and wireless station 123.

Accordingly, this example embodiment illustrates how a trigger event such as activating a new wireless station 123 results in a new (updated) split of the wireless protocol stack 203 (associated with communications 185) to accommodate activation of the new wireless station 123. Thus, as the wireless station 122 supports additional wireless stations, the communication management resource 140 pushes off processing of communication layers to the wireless stations such that the station has more resources to accommodate processing of the additional communications from the new wireless stations.

Figure 10:
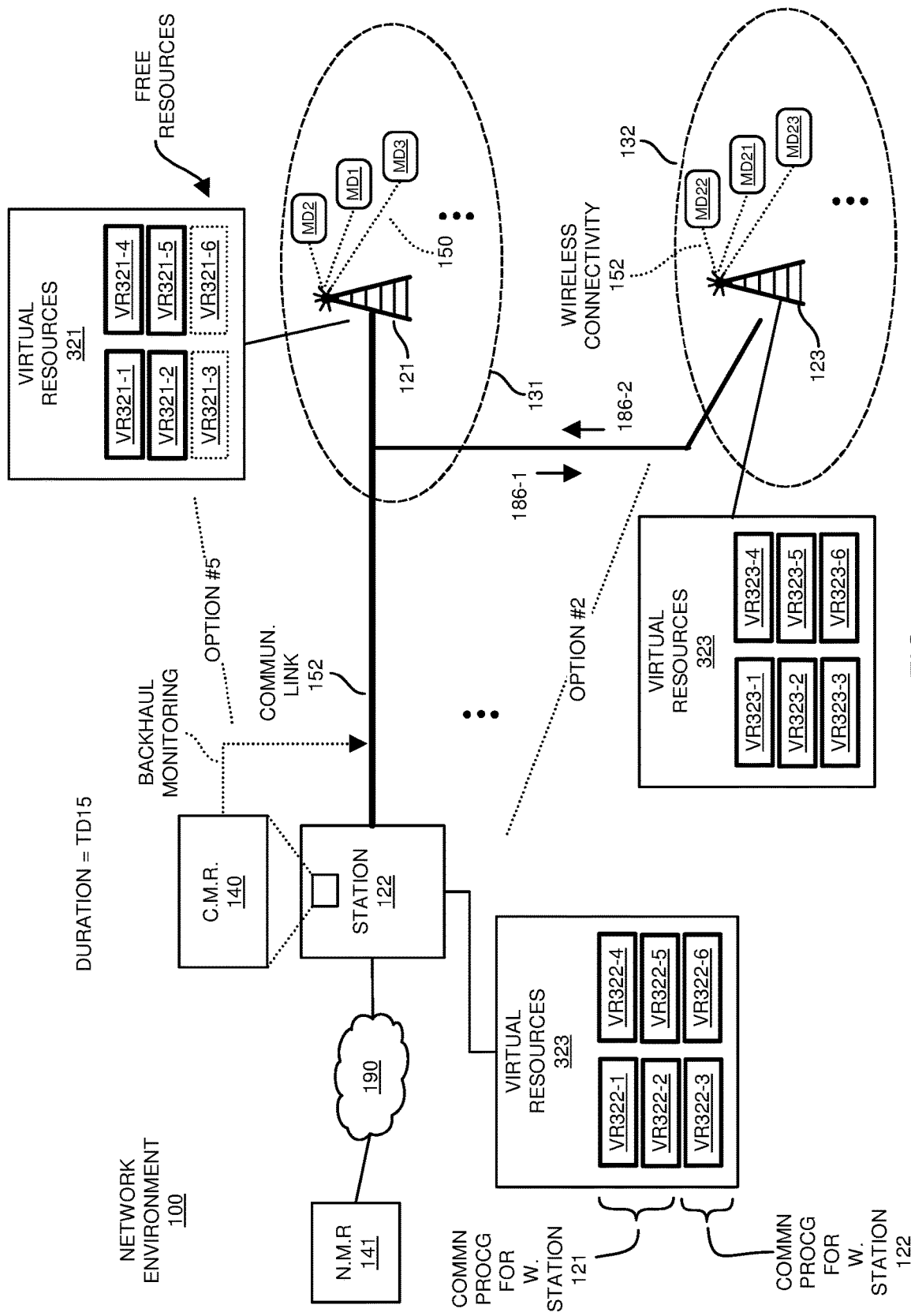
FIG. 10 is an example diagram illustrating selection and implementation of different split layer processing amongst multiple wireless stations and core processing resources according to embodiments herein.

FIG. 10 is an example diagram illustrating selection of different split layer processing amongst multiple stations according to embodiments herein.

For example, as shown in FIG. 10, the communication management resource 140 selects split option #5 to support processing of communications 185 between the station 122 and the station 121. In such an instance, for time duration TD15, the communication management resource 140 allocates virtual resources VR322-1, VR322-2, VR322-4, and VR322-5 to process layers 210, 220, 230, 240, 245, and 250 associated with communications 185 between station 122 and station 121. The communication management resource 140 (or other suitable resource) allocates virtual resources VR321-1, VR321-2, VR321-4, and VR321-5 to process layers 255, 260, 265, and 270 associated with communications between station 122 and station 121.

Additionally, the communication management resource 140 selects split option #2 to support processing of communications 186 between the station 122 and the station 123. In such an instance, for time duration TD15, the communication management resource 140 allocates virtual resources VR322-3 and VR322-6 to process layers 210, 220, and 230 associated with communications between station 123 and station 121. The communication management resource 140 (or other suitable resource) allocates virtual resources VR323-1, VR323-2, VR323-3, VR323-4, VR321-5, and VR323-6 to process layers 240, 245, 250, 255, 260, 265, and 270 associated with communications between station 122 and station 123.

Thus, splitting of the wireless protocol stack 203 for each of different wireless stations enables dynamic control and freeing up of different virtual resources on an as-needed basis to accommodate changing network conditions and re-assignment of virtual resources from one task to another.

Figure 11:
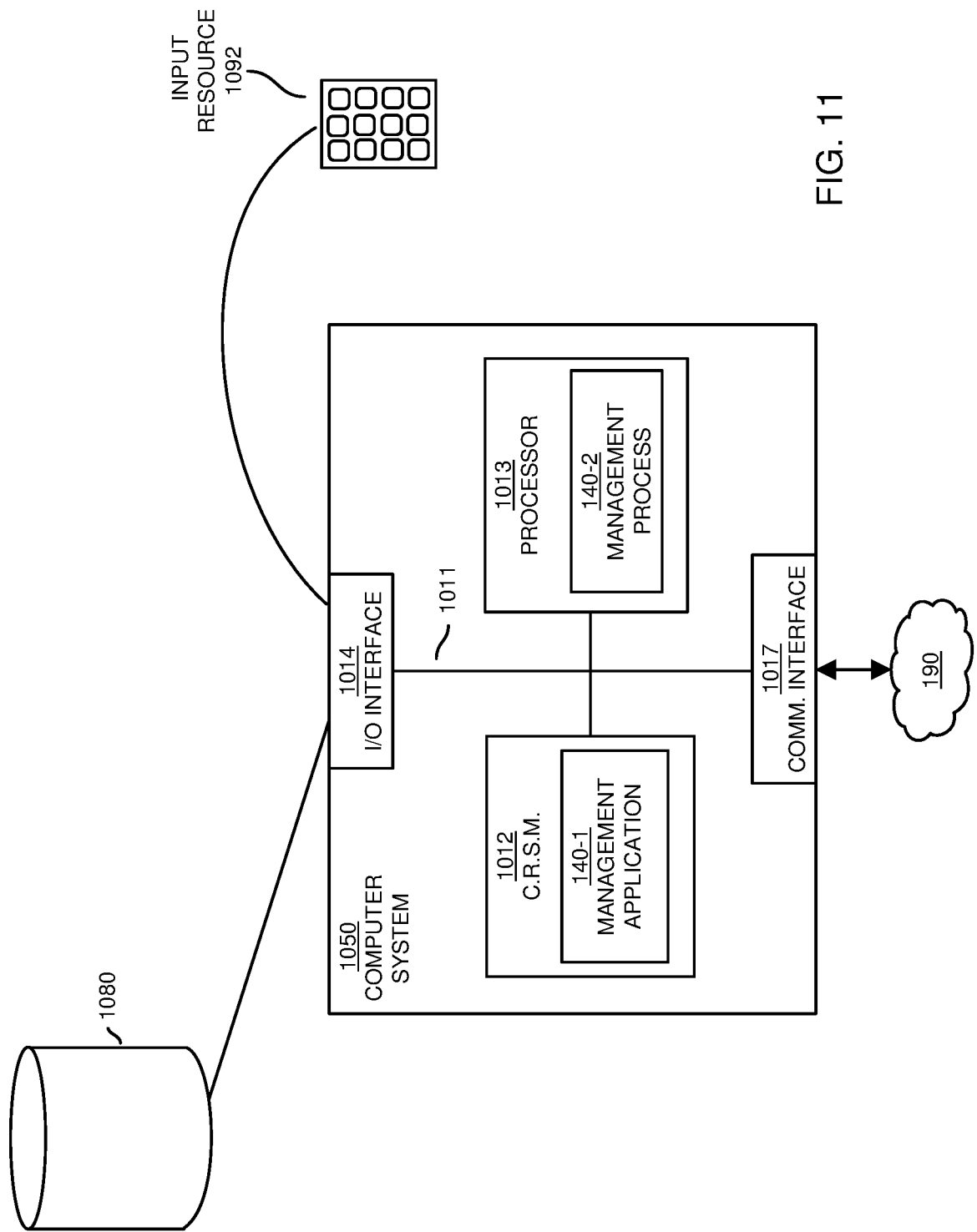
FIG. 11 is a diagram illustrating an example computer architecture to execute one or more operations according to embodiments herein.

FIG. 11 is an example block diagram of a computer system for implementing any of the operations as discussed herein according to embodiments herein.

Any of the resources (such as virtual resources, communication management resource 140, monitor resource 137, network management resource 141, station 122, wireless station 121, wireless station 123, etc.) as discussed herein can be configured to include a respective instantiation of computer processor hardware and corresponding executable instructions to carry out the different operations as discussed herein.

As shown, computer system 1050 of the present example can include an interconnect 1011 that couples computer readable storage media 1012 such as a non-transitory type of media (i.e., any type of hardware storage medium) in which digital information can be stored and retrieved, a processor 1013, I/O interface 1014, and a communications interface 1017.

I/O interface 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with communication management application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in communication management application 140-1 stored on computer readable storage medium 1012. Execution of the communication management application 140-1 produces communication management process 140-2 to carry out any of the operations and/or processes as discussed herein.

Those skilled in the art will understand that the computer system 1050 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIGS. 12, 13, and 14. Note that the steps in the flowcharts below can be executed in any suitable order.

Figure 12:
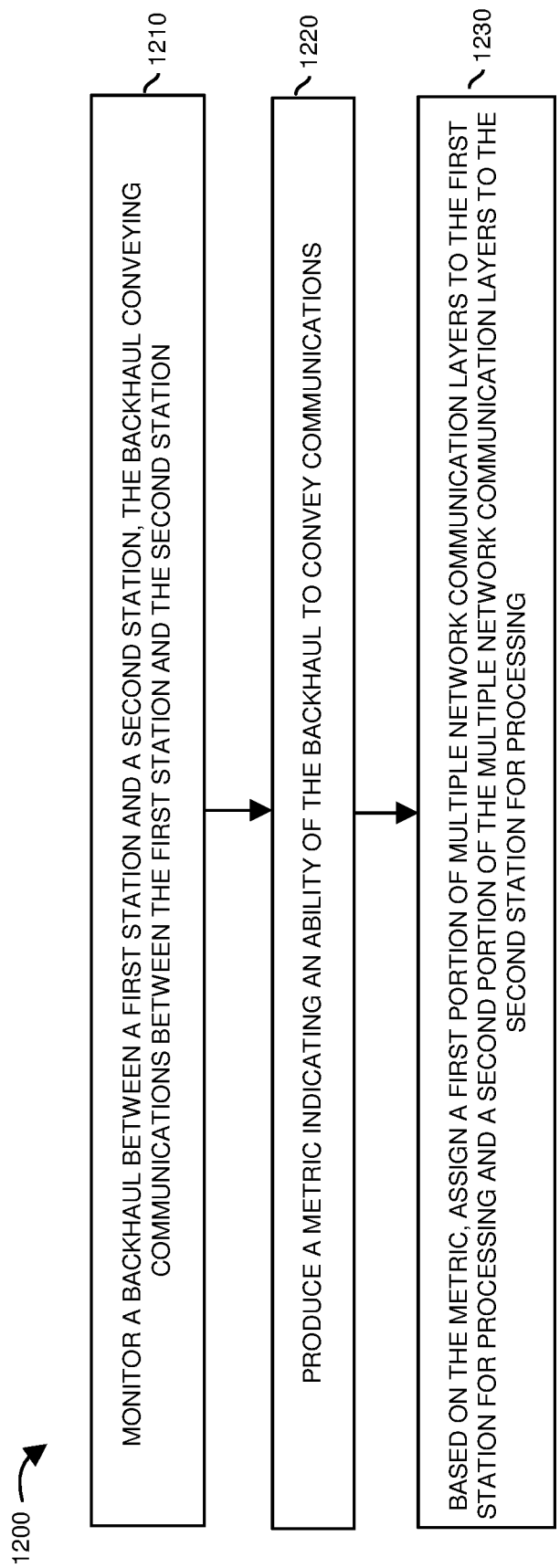
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, the monitor resource 137 monitors a communication link 152 (such as a so-called backhaul) between the first station 121 and the second station 122. The communication link 152 conveys respective communications between the first station 121 and the second station 122.

In processing operation 1220, the communication management resource 140 produces a metric indicating an ability of the communication link 152 to convey communications.

In processing operation 1230, based on the metric, the controller 140 assigns a first portion of multiple network communication layers to the first station 121 (and processing resources) for processing and a second portion of the multiple network communication layers to the second station 122 (and corresponding processing resources) for processing.

Figure 13:
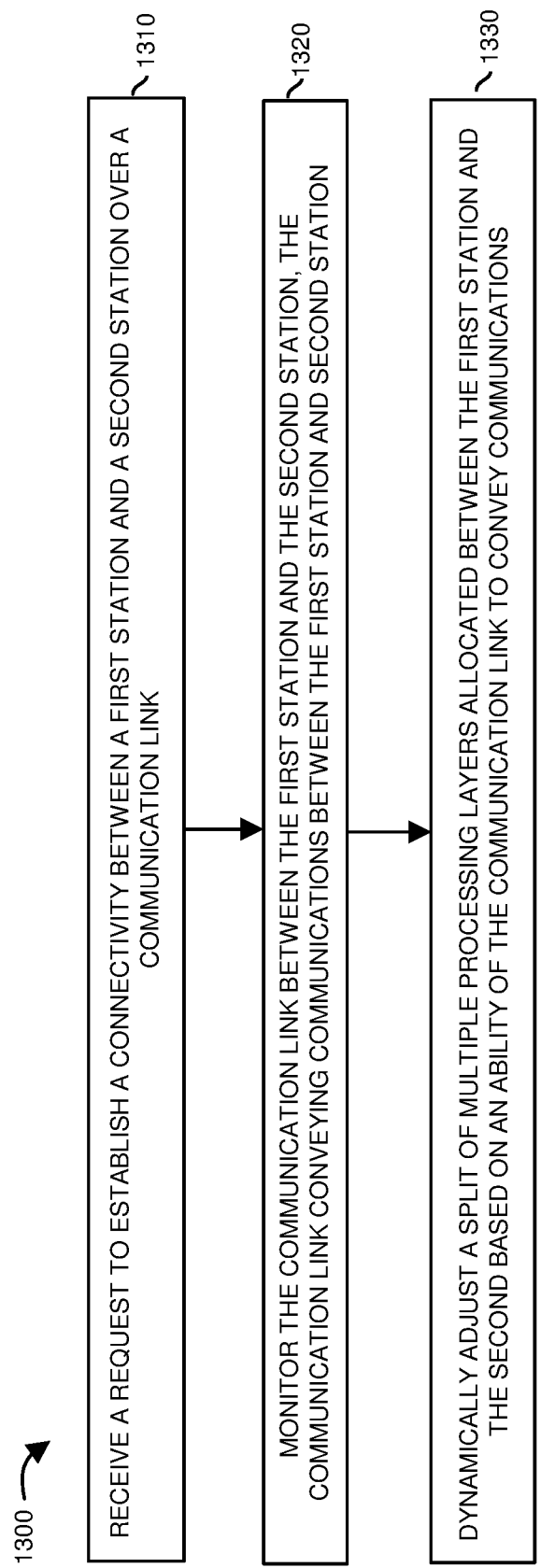
FIG. 13 is an example diagram illustrating a method according to embodiments herein.

FIG. 13 is a flowchart 1300 illustrating an example method according to embodiments. Note that there will be some overlap with respect to concepts as discussed above.

In processing operation 1310, the controller 140 of station 122 receives a request to establish a connectivity between the first station 121 and the second station 122 over the communication link 152.

In processing operation 1320, the monitor resource 137 monitors the communication link 152 between the first station 121 and the second station 122; the communication link 152 conveys communications 185 between the first station 121 and the second station 122.

In processing operation 1330, the station 122 dynamically adjusts a split of multiple processing layers allocated between the first station 121 and the second station 122 based on an ability of the communication link 152 to convey communications.

Figure 14:
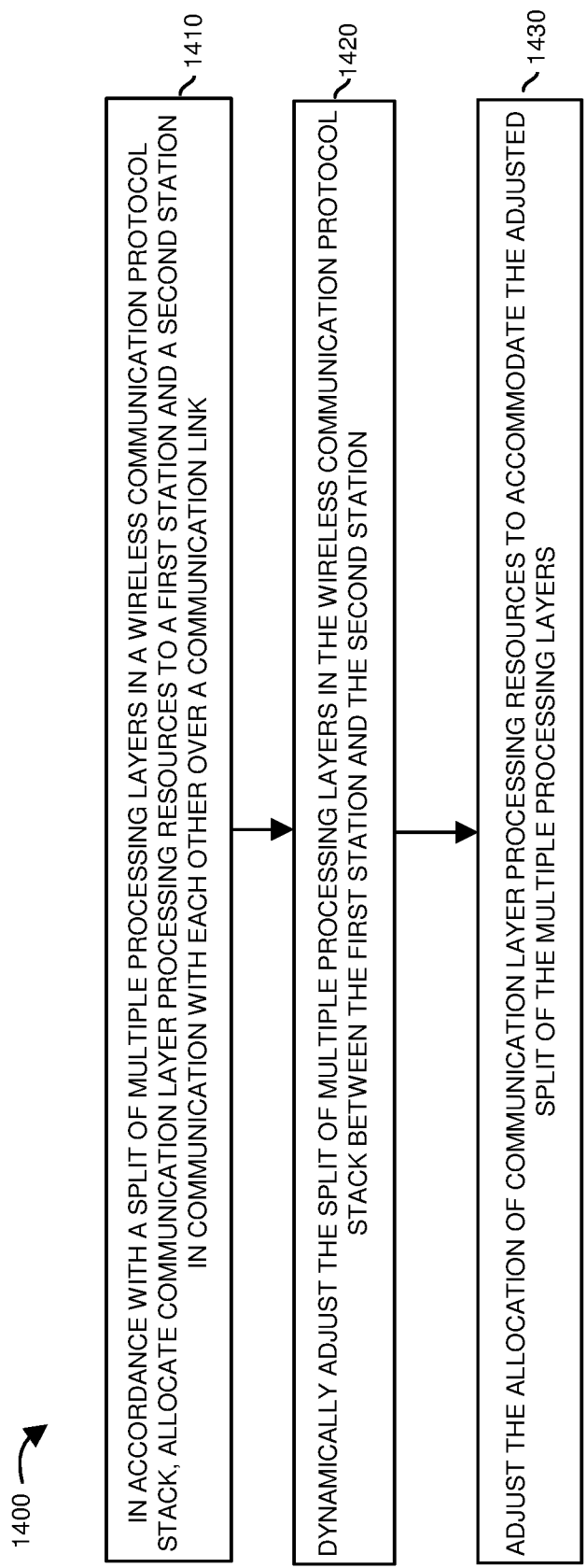
FIG. 14 is an example diagram illustrating a method according to embodiments herein.

FIG. 14 is a flowchart 1400 illustrating an example method according to embodiments. Note that there will be some overlap with respect to concepts as discussed above.

In processing operation 1410, in accordance with a selected split of multiple processing layers in a wireless communication protocol stack 203, the communication management resource 140 allocates communication layer processing resources (such as virtual resources) to a first station 121 and a second station 122 in communication with each other over a communication link 152.

In processing operation 1420, the communication management resource 140 dynamically adjusts the split of multiple processing layers in a wireless communication protocol stack 203 for processing communications 185 between the first station 121 and the second station 122.

In processing operation 1430, the communication management resource 140 adjusts the allocation of communication layer processing resources (such as virtual resources) to accommodate the adjusted split of the multiple processing layers in the wireless protocol stack 203.

Note again that techniques herein are well suited to facilitate a dynamic split of processing communication layers to support wireless services to one or more communication devices in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    monitoring a backhaul between a first station and a second station, the backhaul conveying communications between the first station and the second station, the first station providing wireless connectivity to multiple mobile communication devices;
    evaluating an ability of the backhaul to convey the communications; and
    based on the evaluation, assigning a first portion of multiple network communication layers in a wireless protocol stack to the first station for processing the communications and a second portion of the multiple network communication layers in the wireless protocol stack to the second station for processing the communications, the multiple network communication layers in the wireless protocol stack supporting the wireless connectivity to the multiple mobile communication devices.

2. The method as in claim 1, wherein evaluating the backhaul includes producing a metric, the metric being a first metric indicating the ability to convey first communications over the backhaul at a first instant in time, the method further comprising:
    producing a second metric indicating an ability of the backhaul to convey communications at a second instant in time; and based on the second metric, adjusting the split of processing the communication layers between the first station and the second station.

3. The method as in claim 2, wherein adjusting the split includes: i) assigning a less-than-all portion of the multiple communications layers for processing by the first station for a first duration of time based on the first metric, and ii) re-assigning the less-than-all portion of the multiple communications layers for processing by the second station for a second duration of time based on the second metric, the second duration of time occurring subsequent to the first duration of time.

4. The method as in claim 1 further comprising:
repeatedly monitoring and evaluating a quality of the communications conveyed over the backhaul; and
in response to detecting a degradation in a quality of conveying the communications over the backhaul via the monitoring and evaluating, re-assigning processing of a particular network communication layer of the multiple network communication layers from the first station to the second station.

5. The method as in claim 1, wherein the multiple network communication layers are layers in a wireless communication layer hierarchy supporting the wireless connectivity to the multiple communication devices.

6. The method as in claim 1 further comprising:
repeatedly monitoring a quality of the communications conveyed over the backhaul; and
in response to detecting an increase in a quality of conveying the communications over the backhaul, re-assigning processing of a particular network communication layer from the second station to the first station.

7. The method as in claim 1, wherein the multiple network communication layers include upper communication layers and lower communication layers in the wireless protocol stack.

8. The method as in claim 1, wherein each of the first station and the second station are configurable to process different portions of the multiple network communication layers.

9. The method as in claim 1, wherein a magnitude of a metric generated during the evaluating is based on a latency associated with conveying the communications over the backhaul between the first station and the second station.

10. The method as in claim 1, wherein a magnitude of a metric generated during the evaluating is based on an amount of bandwidth in the backhaul that is available for allocation to communications between the first station and the second station.

11. The method as in claim 1, wherein the magnitude of a metric generated during the evaluating depends on a combination of latency of transmitting the communications over the backhaul and an amount of bandwidth available for allocation in the backhaul.

12. The method as in claim 1 further comprising:
communicating a request to allocate a first portion of the multiple network communication layers to the first station for processing and a second portion of the multiple network communication layers to the second station for processing; and
in response to communicating the request, receiving a configuration response from a network manager managing apportionment of the multiple network communication layers, the configuration response configuring a split of the multiple network communication layers between the first station and the second station.

13. The method as in claim 1 further comprising:
in accordance with a split of the multiple network communication layers in the wireless protocol stack, allocating communication layer processing resources to the first station and the second station;
dynamically adjusting the split of the multiple network communication layers in the wireless protocol stack between the first station and the second station; and
adjusting the allocation of communication layer processing resources to accommodate the adjusted split of the multiple network communication layers in the wireless protocol stack.

14. The method as in claim 13, wherein both the first station and the second station support execution of a first processing layer in the wireless protocol stack; and
wherein dynamically adjusting the split of the multiple network communication layers includes: i) initially assigning, for a first duration of time, the first processing layer in the wireless protocol stack for execution via resources associated with the first station, and ii) as specified by the adjusted split, re-assigning, for a second duration of time, the first processing layer for execution by resources associated with the second station.

15. The method as in claim 14,
wherein a combination of first processing hardware associated with the first station and second processing hardware associated with the second station execute the multiple network communication layers in the wireless protocol stack, execution of the multiple network communications layers supporting conveyance of data packets associated with the mobile communication devices.

16. The method as in claim 13, wherein dynamically adjusting the split of multiple network communication layers allocated between the first station and the second station includes:
initially allocating a particular communication processing layer of the multiple network communication layers to the first station; and
in response to a change in a quality of conveying the communication via the backhaul, re-assigning processing of the particular communication processing layer from the first station to the second station.

17. The method as in claim 13, wherein the ability to communicate over the backhaul depends on a combination of a latency of conveying the communications over the backhaul link and an amount of bandwidth in the backhaul available for allocation.

18. The method as in claim 1, wherein the communications conveyed over the backhaul include data packets, the multiple network communication layers in the wireless protocol stack supporting processing of the data packets.

19. The method as in claim 1 further comprising:
adjusting an allocation of the first portion of multiple network communication layers in the wireless protocol stack in response to detecting activation of a third wireless station.

20. The method as in claim 19, wherein the third wireless station shares use of the backhaul to communicate with the second wireless station.

21. The method as in claim 20, wherein adjusting the allocation of the first portion of multiple network communication layers in the wireless protocol stack includes increasing a number of the multiple network communication layers allocated to the first wireless station in response to detecting activation of the third wireless station.

22. The method as in claim 1, wherein the communications include downstream communications conveyed from the second wireless station to the first wireless station; and
wherein the communications include upstream communications conveyed from the first wireless station to the second wireless station.

23. The method as in claim 22, wherein the first portion of the multiple network communication layers in the wireless protocol stack are allocated to process a first portion of the upstream communications and a first portion of the downstream communications; and
wherein the second portion of the multiple network communication layers in the wireless protocol stack are allocated to process a second portion of the upstream communications and a second portion of the downstream communications.

24. The method as in claim 23, wherein the first portion of the multiple network communication layers in the wireless protocol stack includes an RF (Radio Frequency) layer; and
wherein the second portion of the multiple network communication layers in the wireless protocol stack includes a data layer.

25. The method as in claim 1 further comprising:
determining a latency value indicating a round-trip time trip time of conveying a first data packet over the backhaul from the second wireless station to the first wireless station and back to the second wireless station; and
utilizing the latency value as a basis to apportion use of the multiple network communication layers.

26. The method as in claim 1 further comprising:
evaluating the ability of the backhaul to convey the communications in response to receiving a configuration request from the first wireless station.

27. The method as in claim 26, wherein assigning the first portion of multiple network communication layers in the wireless protocol stack to the first station includes: in response to receiving the configuration request, communicating a configuration command from the second wireless station to the first wireless station, the configuration command notifying the first wireless station to process the first portion of the multiple network communication layers of the communications conveyed over the backhaul.

28. A system comprising:
communication management hardware operative to:
monitor a backhaul between a first station and a second station, the backhaul conveying communications between the first station and the second station, the second station providing wireless connectivity to multiple mobile communication devices;
produce a metric indicating an ability of the backhaul to convey the communications; and
based on the metric, adjusting a split of multiple communication processing layers of a wireless protocol stack between the first station and the second station, the multiple communication processing layers in the wireless protocol stack supporting wireless connectivity to the multiple mobile communication devices via conveyance of the communications over the backhaul.

29. The system as in claim 28, wherein the metric is a first metric indicating the ability to convey first communications over the backhaul at a first instant in time, the communication management hardware further operative to:
produce a second metric indicating an ability of the backhaul to convey communications at a second instant in time; and
based on the second metric, adjust the split of executing the communication processing layers between the first station and the second station.

30. The system as in claim 29, wherein the communication management hardware is further operative to: i) assign a less-than-all portion of the multiple communication processing layers for execution by the first station for a first duration of time based on the first metric, and ii) re-assign the less-than-all portion of the multiple communication processing layers for execution by the second station for a second duration of time based on the second metric, the second duration of time occurring subsequent to the first duration of time.

31. The system as in claim 28, wherein the communication management hardware is further operative to:
repeatedly monitor a quality of the communications conveyed over the backhaul; and
in response to detecting a degradation in a quality of conveying the communications over the backhaul, re-assign processing of a particular communication processing layer from the first station to the second station.

32. The system as in claim 28, wherein the multiple communication processing layers are layers in a wireless protocol stack.

33. The system as in claim 28, wherein the communication management hardware is further operative to:
repeatedly monitor a quality of conveying the communications over the backhaul; and
in response to detecting an increase in a quality of conveying the communications over the backhaul, re-assign processing of a particular communication processing layer from the second station to the first station.

34. The system as in claim 28, wherein the multiple communication processing layers include upper communication layers and lower communication layers in the wireless protocol stack.

35. The system as in claim 28, wherein each of the first station and the second station are configurable to process different portions of the multiple communication processing layers.

36. The system as in claim 28, wherein a magnitude of the metric is based on a latency associated with conveying the communications over the backhaul between the first station and the second station.

37. The system as in claim 28, wherein a magnitude of the metric is based on an amount of bandwidth in the backhaul that is available for allocation to communications between a radio controller and the wireless base station.

38. The system as in claim 28, wherein the magnitude of the metric depends on a combination of latency of transmitting the communications over the backhaul and an amount of bandwidth available for allocation in the backhaul.

39. Computer-readable storage hardware having instructions stored thereon, the instructions, when carried out by computer processor hardware, cause the computer processor hardware to:
monitor a communication link between a first station and a second station, the communication link conveying communications between the first station and the second station, the first station providing wireless connectivity to multiple mobile communication devices;
evaluate an ability of the backhaul to convey communications over the backhaul; and based on the evaluation, assign a first portion of multiple network communication layers in a wireless protocol stack to the first station for processing of the communications and a second portion of the multiple network communication layers in the wireless protocol stack to the second station for processing of the communications, the multiple network communication layers in the wireless protocol stack supporting the wireless connectivity to the multiple mobile communication devices.

* * * * *

UNITED STATES PATENT AND TRADEMARK OFFICE
CERTIFICATE OF CORRECTION

PATENT NO. : 11,438,768 B2
APPLICATION NO. : 16/580532
DATED : September 6, 2022
INVENTOR(S) : Lakhbir Singh It is certified that error appears in the above-identified patent and that said Letters Patent is hereby corrected as shown below:

In the Claims

Column 20, Line 42, Claim 16, replace "communication" with --communications--

Signed and Sealed this
Twentieth Day of December, 2022

Katherine Kelly Vidal
*Director of the United States Patent and Trademark Office*